United States Patent
Chen et al.

(10) Patent No.: US 9,001,749 B2
(45) Date of Patent: Apr. 7, 2015

(54) COMMUNICATION APPARATUS AND BLUETOOTH ID PACKET RECOGNITION METHOD THEREOF

(75) Inventors: Yuan Chen, Hsinchu (TW); Ting-Che Tseng, Hsinchu (TW); Wen-Ying Chien, Hsinchu (TW); Wei-Lun Wan, Hsinchu (TW); Wei-Kun Su, Taipei (TW); Hong-Kai Hsu, Yonghe (TW)

(73) Assignee: MediaTek Inc., Hsin-Chu (TW)

( * ) Notice: Subject to any disclaimer, the term of this patent is extended or adjusted under 35 U.S.C. 154(b) by 1075 days.

(21) Appl. No.: 13/007,789

(22) Filed: Jan. 17, 2011

(65) Prior Publication Data

US 2011/0255414 A1  Oct. 20, 2011

Related U.S. Application Data

(60) Provisional application No. 61/324,340, filed on Apr. 15, 2010.

(51) Int. Cl.
*H04W 4/00* (2009.01)
*H04B 1/18* (2006.01)
*H04W 8/00* (2009.01)
*H04W 84/18* (2009.01)

(52) U.S. Cl.
CPC .............. *H04W 8/005* (2013.01); *H04W 84/18* (2013.01); *Y02B 60/50* (2013.01)

(58) Field of Classification Search
CPC .................................. H04W 8/005; H04W 8/18
USPC ......... 370/255, 282, 329, 330, 341, 350, 449, 370/465, 480, 496, 503, 912; 455/161.1, 455/434
See application file for complete search history.

(56) References Cited

U.S. PATENT DOCUMENTS

| | | | |
|---|---|---|---|
| 2006/0128308 A1 | 6/2006 | Michael et al. | |
| 2009/0046763 A1 | 2/2009 | Kerai | |
| 2011/0255414 A1* | 10/2011 | Chen et al. | 370/241 |

* cited by examiner

*Primary Examiner* — Benjamin H Elliott, IV
(74) *Attorney, Agent, or Firm* — McClure, Qualey & Rodack, LLP

(57) ABSTRACT

A communication apparatus is provided. The communication apparatus includes an RF module, a down converter coupled to the RF module and a detector coupled to the down converter. The RF module receives an RF signal. The down converter down converts the RF signal in response to a channel select signal to generate a converted signal, wherein the channel select signal controls the down converter to alternately sweep a plurality of scan trains during a scan frame, and each of the scan trains comprises a plurality of channels. The power detector determines whether the RF signal comprises an ID packet according to the converted signal corresponding to the channels of the plurality of scan trains.

27 Claims, 9 Drawing Sheets

COMMUNICATION APPARATUS AND BLUETOOTH ID PACKET RECOGNITION METHOD THEREOF

CROSS REFERENCE TO RELATED APPLICATIONS

This application claims the benefit of U.S. Provisional Application No. 61/324,340, filed on Apr. 15, 2010, the entirety of which is incorporated by reference herein.

BACKGROUND OF THE INVENTION

1. Field of the Invention

The present invention is related to a communication apparatus, and more particularly to a communication apparatus for recognizing an ID packet comprised in an RF signal.

2. Description of the Related Art

Bluetooth wireless technology is a short-range communications technology, which is able to replace cables which connect portable and/or fixed devices for communications while maintaining high levels of security. The key features of Bluetooth technology are robustness, low power, and low cost. The Bluetooth specification defines a uniform structure for a wide range of devices to connect and communicate with each other.

All Bluetooth devices default to a standby mode. In a standby mode, unconnected devices periodically listen for messages. This procedure is called scanning which is divided into two types: page scan and inquiry scan. A page scan is defined as a connection sub-state in which a device listens for its own device access code (DAC) (via a "page") for a scan window duration (11.25 ms) every 1.28 seconds in order to set up an actual connection between devices. An inquiry scan is very similar to a page scan except that in this sub-state the receiving device scans for the inquiry access code (IAC) (via an "inquiry"). The inquiry scan is used to discover which devices are in a range and addresses and clocks of devices in the range. Therefore, a normal scan procedure is typically performed during the scan window (11.25 ms) for a Bluetooth device.

A page sub-state is used by a master Bluetooth device to activate and connect to a slave Bluetooth device which periodically wakes up in the page scan sub-state. The master Bluetooth device tries to capture the slave Bluetooth device by repeatedly transmitting the slave's device access code (DAC) in different hop channels. In the page sub-state, the master Bluetooth device transmits the device access code (ID packet) corresponding to the targeted slave Bluetooth device for connection, rapidly on a large number of different hop frequencies. Since the ID packet is a very short packet, the hop rate can be increased from 1600 hops/s to 3200 hops/s. Since the Bluetooth clocks of the master and the slave Bluetooth devices may not be synchronized, in this case, the master Bluetooth device would not precisely know when the slave Bluetooth device has waken up and which hop frequency the slave Bluetooth device is on. Therefore, the master Bluetooth device transmits a train of identical DACs at different hop frequencies, and listens in between the transmitted intervals until the master Bluetooth device receives a response from the slave Bluetooth device. FIG. 1 shows a timing diagram illustrating page and inquiry scan transmissions, wherein pairs of page or inquiry scan messages 100 are repeated within the scan window (11.25 ms) in accordance with the Bluetooth specification.

However, when in standby mode, a Bluetooth device will consume power due to the inquiry scan and the page scan. This can be undesirable in that considerable battery power is consumed even while the Bluetooth device is unconnected.

Therefore, a communication apparatus and a Bluetooth ID packet recognition method thereof are desired to reduce power consumption of the communication apparatus when in a standby mode.

BRIEF SUMMARY OF THE INVENTION

A communication apparatus for recognizing an ID packet comprised in an RF signal and a method thereof are provided. An embodiment of a communication apparatus is provided. The communication apparatus comprises an RF module, a down converter coupled to the RF module and a detector coupled to the down converter. The RF module receives an RF signal. The down converter down converts the RF signal in response to a channel select signal to generate a converted signal, wherein the channel select signal controls the down converter to alternately sweep a plurality of scan trains during a scan frame, and each of the scan trains comprises a plurality of channels. The detector determines whether the RF signal comprises an ID packet according to the converted signal corresponding to the channels of the plurality of scan trains.

Furthermore, an embodiment of a method for recognizing an ID packet comprised in an RF signal is provided. An RF signal is received. The RF signal is converted to generate a converted signal by alternately sweeping a plurality of scan trains during a scan frame, wherein each of the scan trains comprises a plurality of channels. A scan procedure is performed on the converted signal. It is determined whether the RF signal comprises an ID packet according to the scan results.

Furthermore, an embodiment of a method for recognizing a Bluetooth ID packet is provided. The method comprises receiving an RF signal, converting the RF signal to generate a converted signal with reference to a channel select signal, performing a scan procedure on the converted signal, and determining whether the RF signal comprises a Bluetooth ID packet according to the scan results. The channel select signal sweeps N Bluetooth hopping channels during a scan frame, where $32 \le N \le 78$.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
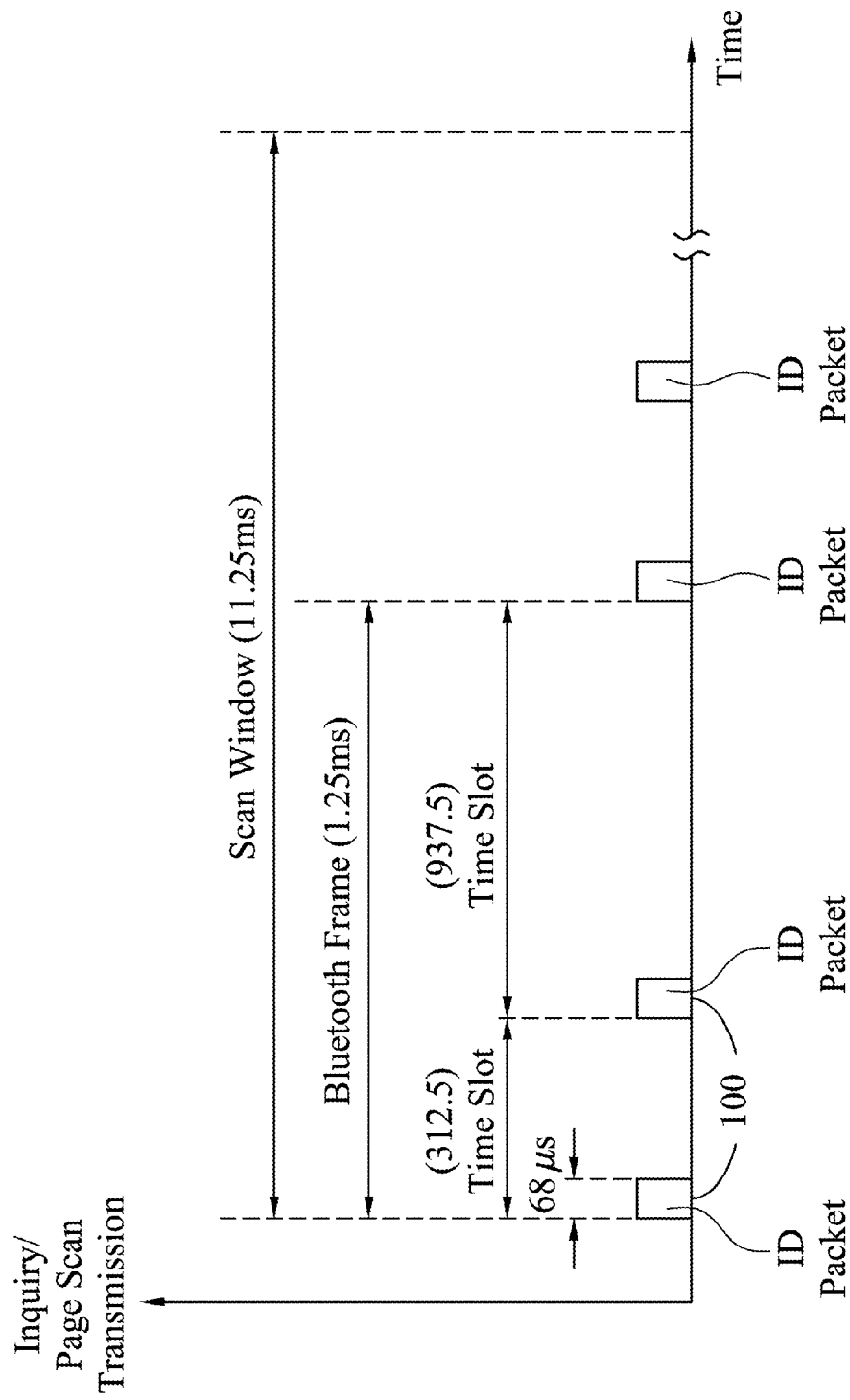
FIG. 1 shows a timing diagram illustrating page and inquiry scan transmissions.

The following description is of the best-contemplated mode of carrying out the invention. This description is made for the purpose of illustrating the general principles of the invention and should not be taken in a limiting sense. The scope of the invention is best determined by reference to the appended claims.

According to the Bluetooth Specification, when in page scan or inquiry scan, a master device transmits on a page hopping sequence which includes 32 frequencies. Each of the 32 frequencies is calculated using the paged unit's Bluetooth Device Address. In order to address this difficulty, the paging sequence includes the 32 frequencies, using a calculated main center frequency and 31 other frequencies, wherein the other frequencies have an offset of +/−16. A new center frequency is calculated every 1.28 s. To handle all 32 frequencies of the paging sequence, the page hopping sequence switches alternately between two paging trains each comprising 16 frequencies. The trains are referred to as the A-train and the B-train. When in the page scan, the master device transmits the A-train 128 times in succession. Then, if a slave device has not responded to the page after 128 transmissions of the A-train, the master device transmits the B-train 128 times in succession. If the slave device does not respond to the B-train, the master device again transmits the A-train. This operation continues until the slave device responds to the master device or until the master device gives up transmitting the trains.

Figure 2:
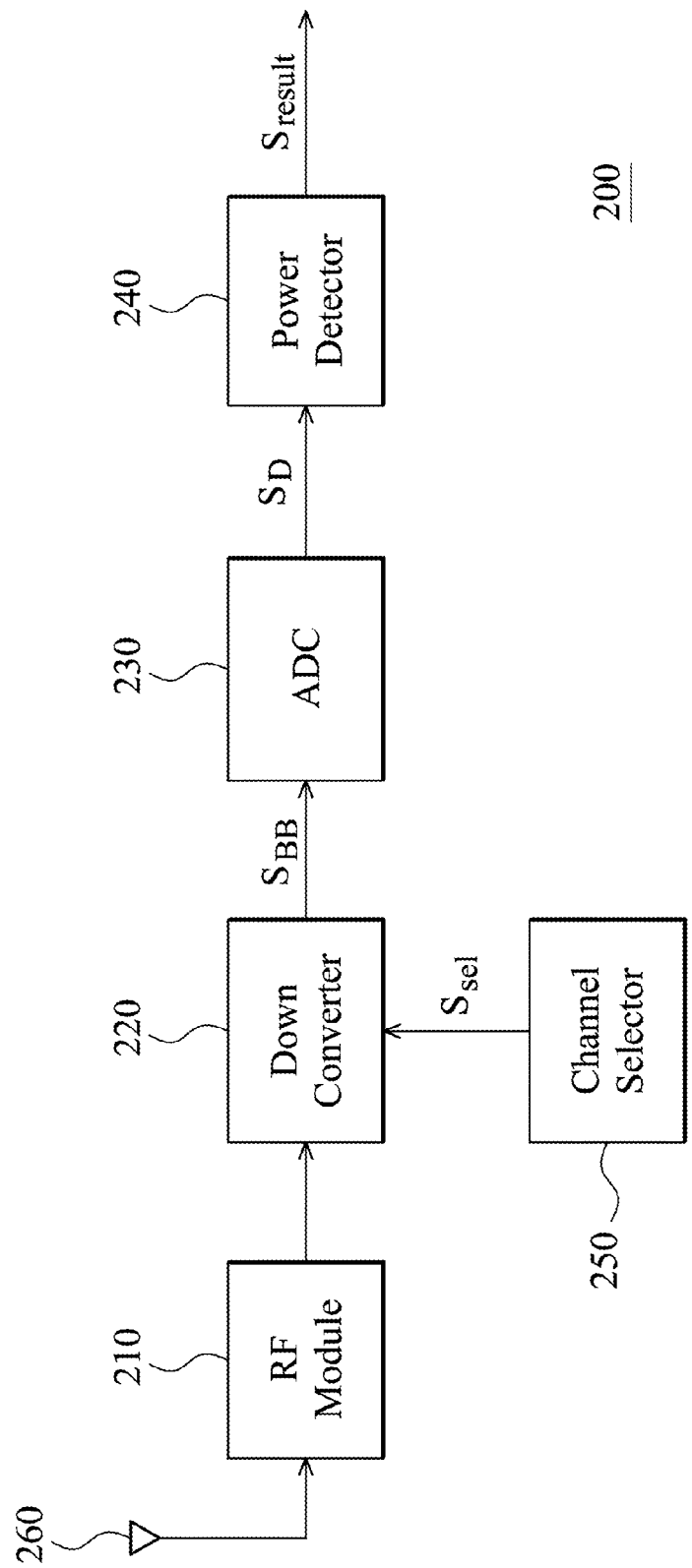
FIG. 2 shows a communication apparatus for recognizing ID packets according to an embodiment of the invention.

FIG. 2 shows a communication apparatus 200 for recognizing Bluetooth ID packets according to an embodiment of the invention. The communication apparatus 200 comprises an RF module 210, a down converter 220, an analog to digital converter (ADC) 230, a power detector 240 and a channel selector 250. In FIG. 2, the RF module 210 receives an RF signal via an antenna 260. Next, the down converter 220 receives a signal from the RF module 210 and down converts the received signal into a converted signal $S_{BB}$ (e.g. an intermediate frequency (IF) signal or a Baseband signal) in response to a channel select signal $S_{sel}$ from the channel selector 250. The channel selector 250 may select at least 32 channels from 79 channels as target channels, and divides the at least 32 channels into a plurality of scan trains such as A-train and B-train. It is to be noted that selecting 32 target channels is used as an example for description, and does not limit the invention. For example, the channel selector 250 may select N (32≤N≤78) channels from 79 channels, and divides the selected N channels into more than two trains. Next, the channel selector 250 may provide the channel select signal $S_{sel}$ to the down converter 220, to control the down converter 220 to alternately sweep the plurality of scan trains such as the A-train and B-train during a scan frame (1250 μs). Therefore, the converted signal $S_{BB}$ is generated corresponding to the channels of the plurality of scan trains arranged by the channel selector 250. Detailed operations will be described in the following paragraphs. Next, the ADC 230 converts the converted signal $S_{BB}$ into a digital signal $S_D$. Next, the power detector 240 may perform an ID packet scan procedure on the digital signal $S_D$, to determine whether the RF signal received by the RF module 210 comprises a Bluetooth ID packet. In one embodiment, the power detector 240 detects the power of the digital signal $S_D$ to obtain a power detection signal $S_{power}$. Next, the power detector 240 may determine whether the RF signal comprises the Bluetooth ID packet according to a power distribution pattern of the power detection signal $S_{power}$ within the scan frame and provides a power decision result $S_{result}$ for subsequent processes. For example, if the Bluetooth ID packet is detected, the communication apparatus 200 may determine whether to set up a connection with the peer Bluetooth device which sent the Bluetooth ID packet. Furthermore, the ADC 230 may be omitted and the power detector 240 may be used to detect the power of the converted signal $S_{BB}$ directly, so as to reduce conversion distortion caused by the ADC 230 and obtain the power detection signal $S_{power}$ accurately. In other words, the power detection can be performed in either analog or digital domain.

Figure 3:
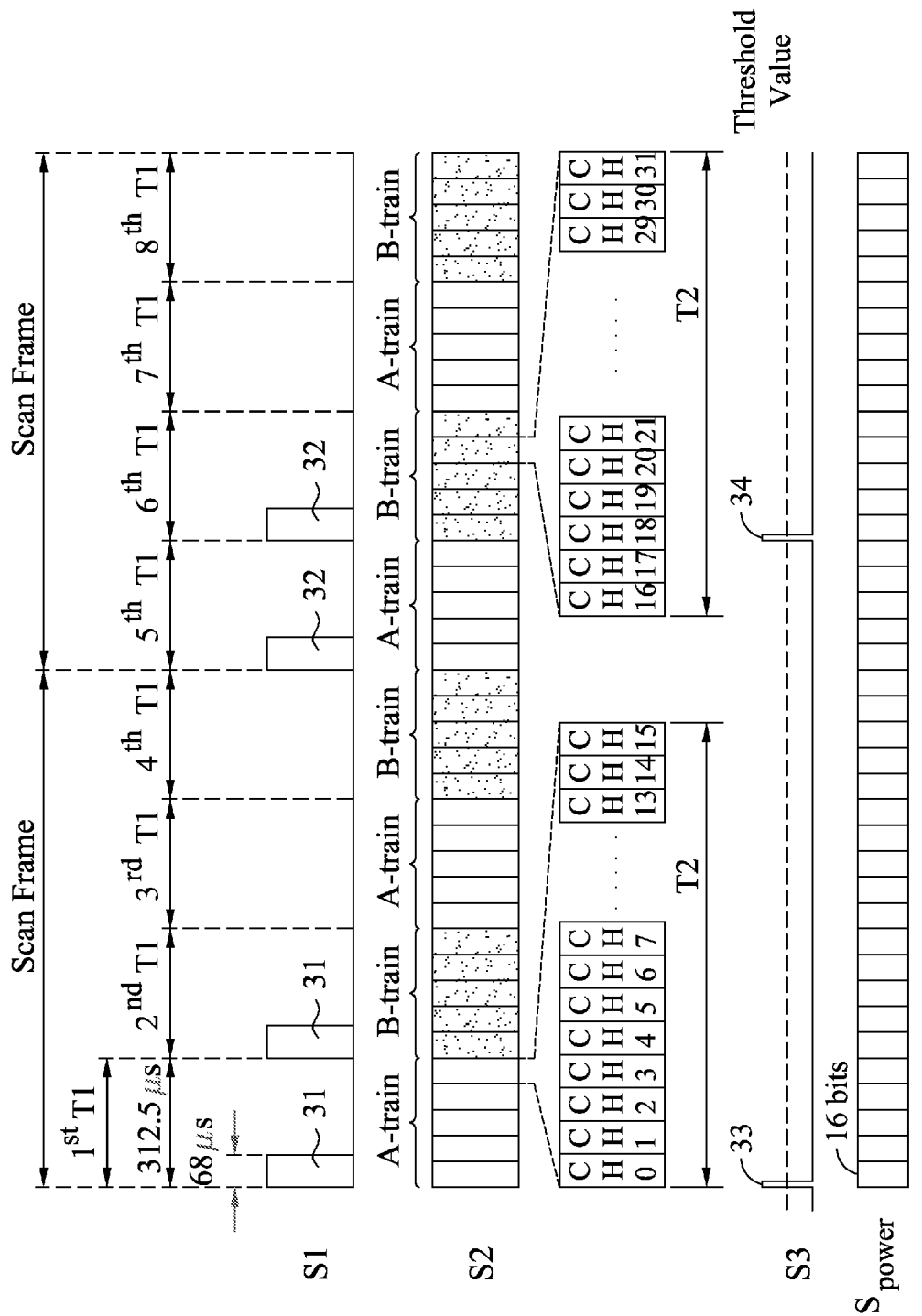
FIG. 3 shows an example illustrating a timing diagram of the signals of the communication apparatus in FIG. 2 according to an embodiment of the invention.

FIG. 3 shows an example illustrating a timing diagram of the signals of the communication apparatus 200 in FIG. 2 according to an embodiment of the invention. In FIG. 3, signal S1 represents an ID packet format in the RF signal received by the RF module 210, signal S2 represents a sweeping state of the communication apparatus 200 illustrating a channel arrangement of an A-train and B-train during every scan frame, and signal S3 represents a power level of the digital signal $S_D$. As defined by the Bluetooth specification, the peer Bluetooth device sending page or inquiry scan messages hops between 32 channels, and a pair of page or inquiry scan messages 31 exists in the $1^{st}$ and $2^{nd}$ time periods T1, and a pair of page or inquiry scan messages 32 exists in the $5^{th}$ and $6^{th}$ time periods T1. In one embodiment, the messages 31 comprising a first ID packet is carried in one channel in the A-train and the messages 32 comprising a second ID packet is carried in one channel in the B-train; in the other embodiment, the messages 31 comprising a first ID packet is carried in one channel in the B-train and the messages 32 comprising a second ID packet is carried in one channel in the A-train. Referring to FIG. 2 and FIG. 3 together, the down converter 220 may sweep the channels of the A-train and B-train according to the channel select signal $S_{sel}$, wherein the channel select signal $S_{sel}$ corresponds the channel arrangement shown in the signal S2. In the embodiment, a scan frame is divided into four time periods T1. Taking the front scan frame as an example, it comprises the $1^{st}$, $2^{nd}$, $3^{rd}$ and $4^{th}$ time periods T1, and the time-length of each time period T1 is 312.5 μs. A sweep time length for each scan train (e.g. A-train and B-train) is substantially equal to the time period T1, and the channel select signal $S_{sel}$ further controls the down converter 220 to alternately sweep the plurality of channels of the scan train during the time period T1. Furthermore, each time period T1 is divided into five time periods T2; thus the time-length of each time period T2 is 62.5 μs. Therefore, the communication apparatus 200 may perform a ID packet scan procedure by using the down converter 220 and the channel selector 250 to sweep the 16 channels of an A-train (e.g. from channel CH0 to channel CH15) for 5 times during the $1^{st}$ time period T1, to sweep the 16 channels (e.g. from channel CH0 to channel CH15) of a B-train for 5 times during the $2^{nd}$ time period T1, to sweep the 16 channels of the A-train for 5 times during the $3^{rd}$ time period T1, and to sweep the 16 channels of the B-train for 5 times during the $4^{th}$ time period T1. Simultaneously, the power detector 240 is used to obtain the power level of each channel within the A-train and B-train. In this way, no matter whether the messages 31 comprising the first ID packet corresponds to the A-train or B-train and the messages 32 comprising the second ID packet corresponds to the B-train or A-train, the communication apparatus 200 can successfully detect the first and second ID packets without sweeping full channels of the RF signal (e.g. without sweeping all 79 hopping channels). For example, when the message 31 comprising the first ID packet is carried in CH1 of the A-train in the $1^{st}$ T1 and $2^{nd}$ T1, a power peak 33 corresponding to CH1 of the A-train in the $1^{st}$ T1 can be detected by the power detector 240 since the sweeping state (signal S2) is in A-train during the $1^{st}$ T1, as shown in signal S3. In another example, when the message 32 comprising the second ID packet is carried in CH1 of the B-train in the $5^{th}$ T1 and $6^{th}$ T1, a power peak 34 corresponding to CH1 of the B-train in the $6^{th}$ T1 can be detected by the power detector 240 since the sweeping state (signal S2) is in B-train during the $6^{th}$ T1, as shown in signal S3. The power detector 240 may further samples the signal S3 and compare the sample values with a threshold value to obtain the power detection signal $S_{power}$. In this embodiment, the power detection signal $S_{power}$ has 16 bits each representing the power level of the signal S3 at individual channel. For example, each bit with a high logic level "1" indicates that the power level of the digital signal $S_D$ corresponding to the individual channel at the individual second time period T2 has exceeded a threshold value, and each bit with a low logic level "0" indicates that the power level of the digital signal $S_D$ corresponding to the individual channel at the individual second time period T2 has not exceeded the threshold value. Thus, the communication apparatus 200 may detect that there is no power or low power level during the $2^{nd}$, $3^{rd}$ and $4^{th}$ time periods T1. It is to be noted that the time lengths of the scan frame, the time period T1, and the time period T2 shown in FIG. 3 are used for description purpose, and does not limit the invention. Moreover, the A-chain and the B-chain may comprise less than or more than 16 channels, and the channel numbers of the A-chain and the B-chain may be different. For example, the A-chain may list 15 channels while the B-chain may list 17 channels. In another example, the A-chain may list 20 channels while the B-chain may list 20 channels. The channels of the A-chain and B-chain can be overlapped or non-overlapped. These modifications all fall within the scope of the present invention, as long as the target channels defined in the Bluetooth specification capable of being used by the Bluetooth device for sending Bluetooth ID packet are included in the scan trains. That is, each of the plurality of scan chains of the channel selector 250 comprises at least a portion of the target channels.

Figure 4:
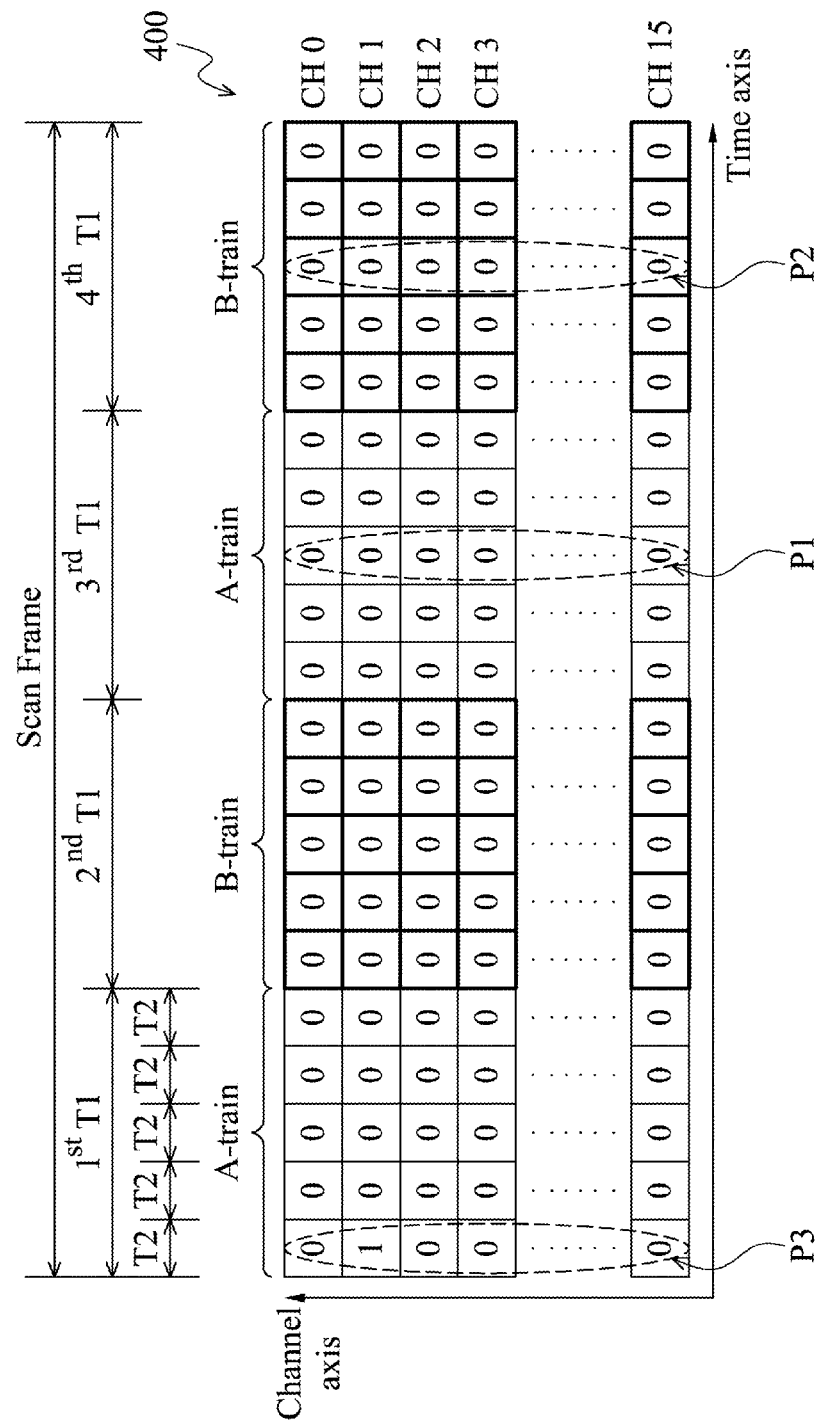
FIG. 4 shows an example illustrating a power distribution pattern of the power detection signal $S_{power}$ of the power detector in FIG. 2 according to an embodiment of the invention.

FIG. 4 shows an example illustrating a power distribution pattern 400 comprised in the power detection signal $S_{power}$ according to an embodiment of the invention. Referring to FIG. 2 and FIG. 4 together, in the embodiment, the power detection signal $S_{power}$ is obtained by periodically detecting the power of the digital signal $S_D$ during a scan frame. The power distribution pattern 400 comprised in the power detection signal $S_{power}$ has a plurality of bits indicating the power level of the digital signal $S_D$ at different time points and different channels of the scan trains respectively. In addition, a power distribution sub-pattern, such as P1, P2 or P3 shown in FIG. 4, comprises a plurality of bits indicating the power level of the digital signal $S_D$ corresponding to the plurality of channels respectively. For example, the bits located in first and second rows of a power distribution sub-pattern P1 respectively correspond to the channels CH0 and CH1 of an A-train, and the bits located in first and second rows of a power distribution sub-pattern P2 respectively correspond to the channels CH0 and CH1 of a B-train. After obtaining the power distribution pattern 400, the power detector 240 may perform a fast scan process which identifies an ID packet by comparing the power distribution pattern 400 with a predefined Bluetooth ID pattern. If the power distribution pattern 400 is determined to match the predefined Bluetooth ID pattern, the power detector 240 generates the power decision result $S_{result}$ to indicate that a Bluetooth ID packet is detected. For example, in the power distribution pattern 400, only the bit located in the second row of a power distribution sub-pattern P3 is at a high logic level "1" and other bits are at a low logic level "0", this indicates that one power peak (the power peak 33 of FIG. 3) is detected in CH1 of A-train. Thus, the power detector 240 may provide the power decision result $S_{result}$ to subsequent circuits to indicate that the power distribution pattern 400 matches a Bluetooth ID pattern (i.e. the RF signal comprises a Bluetooth ID packet) for subsequent processing.

Figure 5:
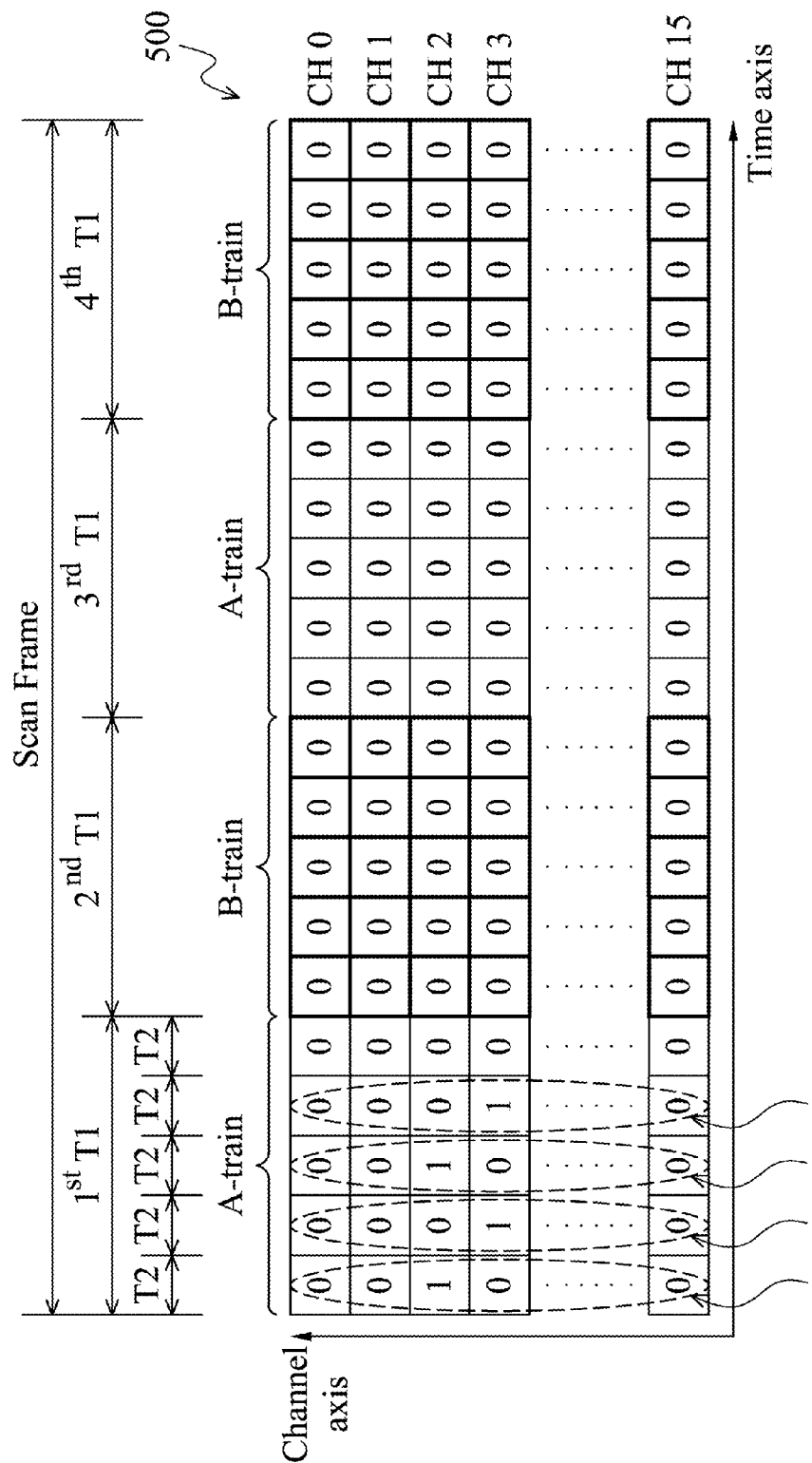
FIG. 5 shows another example illustrating a power distribution pattern of the power detection signal $S_{power}$ of the power detector in FIG. 2 according to an embodiment of the invention.

FIG. 5 shows another example illustrating a power distribution pattern 500 of the power detection signal $S_{power}$ according to an embodiment of the invention. Similarly, in FIG. 5, the power distribution pattern 500 is obtained by periodically detecting the power of the digital signal $S_D$ during a scan frame. After obtaining the power distribution pattern 500, the power detector 240 may provide the power decision result $S_{result}$ to indicate whether the power distribution pattern 500 matches a predefined Bluetooth ID pattern. Furthermore, the power detector 240 may further provide the power decision result $S_{result}$ to indicate whether the power distribution pattern 500 matches a noise/interference pattern.

In the embodiment, the power detector 240 may determine that the power distribution pattern 500 does not match any Bluetooth ID pattern and is a noise/interference because continuous power distribution has been detected (in the $1^{st}$ time period T1, the power distribution sub-patterns P4, P5, P6 and P7 all have bit with high logic level "1"). Next, the power detector 240 provides the power decision result $S_{result}$ to notify subsequent circuits. However, if the communication apparatus 200 continuously detects high power during several scan frames, the communication apparatus 200 may switch from the fast scan procedure to a normal power scan procedure to further confirm whether the RF signal received by the antenna 260 comprises any Bluetooth packets or noise.

FIG. 3 shows an example illustrating a timing diagram of the signals of the communication apparatus 200 in FIG. 2 according to an embodiment of the invention. In FIG. 3, signal S1 represents an ID packet format in the RF signal received by the RF module 210, signal S2 represents a sweeping state of the communication apparatus 200 illustrating a channel arrangement of an A-train and B-train during every scan frame, and signal S3 represents a power level of the digital signal SD. As defined by the Bluetooth specification, the peer Bluetooth device sending page or inquiry scan messages hops between 32 channels, and a pair of page or inquiry scan messages 31 exists in the 1st and 2nd time periods T1, and a pair of page or inquiry scan messages 32 exists in the 5th and 6th time periods T1. In one embodiment, the messages 31 comprising a first ID packet is carried in one channel in the A-train and the messages 32 comprising a second ID packet is carried in one channel in the B-train; in the other embodiment, the messages 31 comprising a first ID packet is carried in one channel in the B-train and the messages 32 comprising a second ID packet is carried in one channel in the A-train. Referring to FIG. 2 and FIG. 3 together, the down converter 220 may sweep the channels of the A-train and B-train according to the channel select signal $S_{sel}$, wherein the channel select signal $S_{sel}$ corresponds the channel arrangement shown in the signal S2. In the embodiment, a scan frame is divided into four time periods T1. Taking the front scan frame as an example, it comprises the 1st, 2nd, 3rd and 4th time periods T1, and the time-length of each time period T1 is $312.5^{\mu s}$. A sweep time length for each scan train (e.g. A-train and B-train) is substantially equal to the time period T1, and the channel select signal $S_{sel}$ further controls the down converter 220 to alternately sweep the plurality of channels of the scan train during the time period T1. Furthermore, each time period T1 is divided into five time periods T2; thus the time-length of each time period T2 is $62.5^{\mu s}$. Therefore, the communication apparatus 200 may perform a ID packet scan procedure by using the down converter 220 and the channel selector 250 to sweep the 16 channels of an A-train (e.g. from channel CH0 to channel CH15) for 5 times during the 1st time period T1, to sweep the 16 channels (e.g. from channel CH16 to channel CH31) of a B-train for 5 times during the 2nd time period T1, to sweep the 16 channels of the A-train for 5 times during the 3rd time period T1, and to sweep the 16 channels of the B-train for 5 times during the 4th time period T1. Simultaneously, the power detector 240 is used to obtain the power level of each channel within the A-train and B-train. In this way, no matter whether the messages 31 comprising the first ID packet corresponds to the A-train or B-train and the messages 32 comprising the second ID packet corresponds to the B-train or A-train, the communication apparatus 200 can successfully detect the first and second ID packets without sweeping full channels of the RF signal (e.g. without sweeping all 79 hopping channels). For example, when the message 31 comprising the first ID packet is carried in CH1 of the A-train in the 1st T1 and 2nd T1, a power peak 33 corresponding to CH1 of the A-train in the 1st T1 can be detected by the power detector 240 since the sweeping state (signal S2) is in A-train during the 1st T1, as shown in signal S3. In another example, when the message 32 comprising the second ID packet is carried in CH17 of the B-train in the 5th T1 and 6th T1, a power peak 34 corresponding to CH17 of the B-train in the 6th T1 can be detected by the power detector 240 since the sweeping state (signal S2) is in B-train during the 6th T1, as shown in signal S3. The power detector 240 may further samples the signal S3 and compare the sample values with a threshold value to obtain the power detection signal $S_{power}$. In this embodiment, the power detection signal $S_{power}$ has 16 bits each representing the power level of the signal S3 at individual channel. For example, each bit with a high logic level "1" indicates that the power level of the digital signal SD corresponding to the individual channel at the individual second time period T2 has exceeded a threshold value, and each bit with a low logic level "0" indicates that the power level of the digital signal SD corresponding to the individual channel at the individual second time period T2 has not exceeded the threshold value. Thus, the communication apparatus 200 may detect that there is no power or low power level during the 2nd, 3rd and 4th time periods T1. It is to be noted that the time lengths of the scan frame, the time period T1, and the time period T2 shown in FIG. 3 are used for description purpose, and does not limit the invention. Moreover, the A-chain and the B-chain may comprise less than or more than 16 channels, and the channel numbers of the A-chain and the B-chain may be different. For example, the A-chain may list 15channels while the B-chain may list 17 channels. In another example, the A-chain may list 20 channels while the B-chain may list 20 channels. The channels of the A-chain and B-chain can be overlapped or non-overlapped. These modifications all fall within the scope of the present invention, as long as the target channels defined in the Bluetooth specification capable of being used by the Bluetooth device for sending Bluetooth ID packet are included in the scan trains. That is, each of the plurality of scan chains of the channel selector 250 comprises at least a portion of the target channels.

FIG. 4 shows an example illustrating a power distribution pattern 400 comprised in the power detection signal $S_{power}$ according to an embodiment of the invention. Referring to FIG. 2 and FIG. 4 together, in the embodiment, the power detection signal $S_{power}$ is obtained by periodically detecting the power of the digital signal SD during a scan frame. The power distribution pattern 400 comprised in the power detection signal $S_{power}$ has a plurality of bits indicating the power level of the digital signal SD at different time points and different channels of the scan trains respectively. In addition, a power distribution sub-pattern, such as P1, P2 or P3 shown in FIG.4, comprises a plurality of bits indicating the power level of the digital signal SD corresponding to the plurality of channels respectively. For example, the bits located in first and second rows of a power distribution sub-pattern P1 respectively correspond to the channels CH0 and CH1 of an A-train, and the bits located in first and second rows of a power distribution sub-pattern P2 respectively correspond to the channels CH16 and CH17 of a B-train. After obtaining the power distribution pattern 400, the power detector 240 may perform a fast scan process which identifies an ID packet by comparing the power distribution pattern 400 with a predefined Bluetooth ID pattern. If the power distribution pattern 400 is determined to match the predefined Bluetooth ID pattern, the power detector 240 generates the power decision result $S_{result}$ to indicate that a Bluetooth ID packet is detected. For example, in the power distribution pattern 400, only the bit located in the second row of a power distribution sub-pattern P3 is at a high logic level "1" and other bits are at a low logic level "0", this indicates that one power peak (the power peak 33 of FIG. 3) is detected in CH1 of A-train. Thus, the power detector 240 may provide the power decision result $S_{result}$ to subsequent circuits to indicate that the power distribution pattern 400 matches a Bluetooth ID pattern (i.e. the RF signal comprises a Bluetooth ID packet) for subsequent processing.

Figure 8:
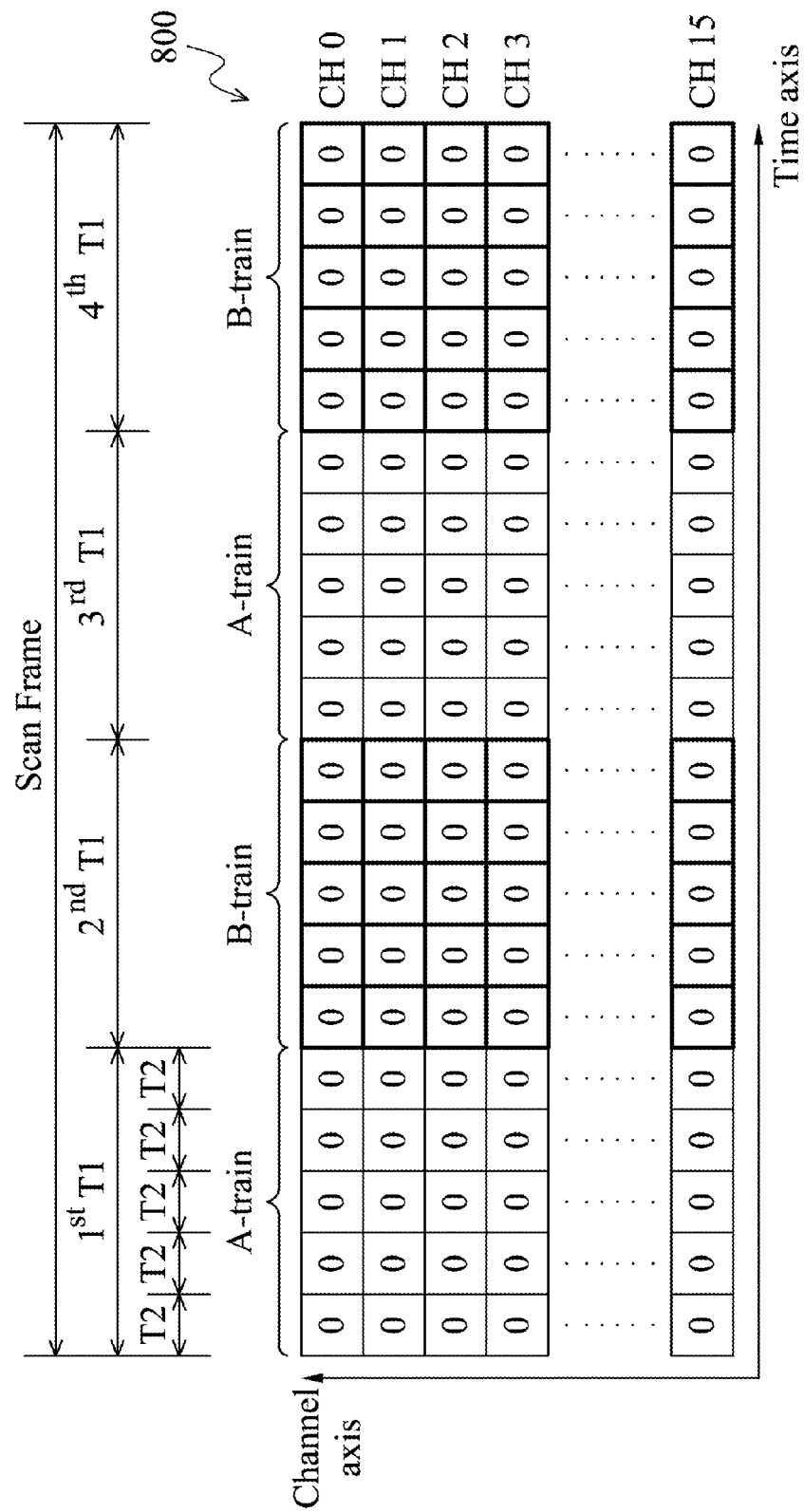
FIG. 8 shows another example illustrating a power distribution pattern of the power detection signal $S_{power}$ of the power detector in FIG. 2 according to an embodiment of the invention.

FIG. 8 shows another example illustrating a power distribution pattern 800 of the power detection signal $S_{power}$ according to an embodiment of the invention. In each of the power distribution sub-patterns of the power distribution pattern 800, no bit with a high logic level "1" exists; which means that the power of the digital signal $S_D$ has not exceeded the threshold value during the fast scan procedure. In this situation where no power or low power level has been detected during several scan frames, a normal power scan procedure may be performed during a scan window (11.25 ms) by the communication apparatus 200 to further confirm whether the RF signal received by the antenna 260 comprises any Bluetooth packets or noise. The communication apparatus 200 may switch from the fast scan procedure to the normal power scan procedure to assist in recognizing Bluetooth ID packets.

Figure 6:
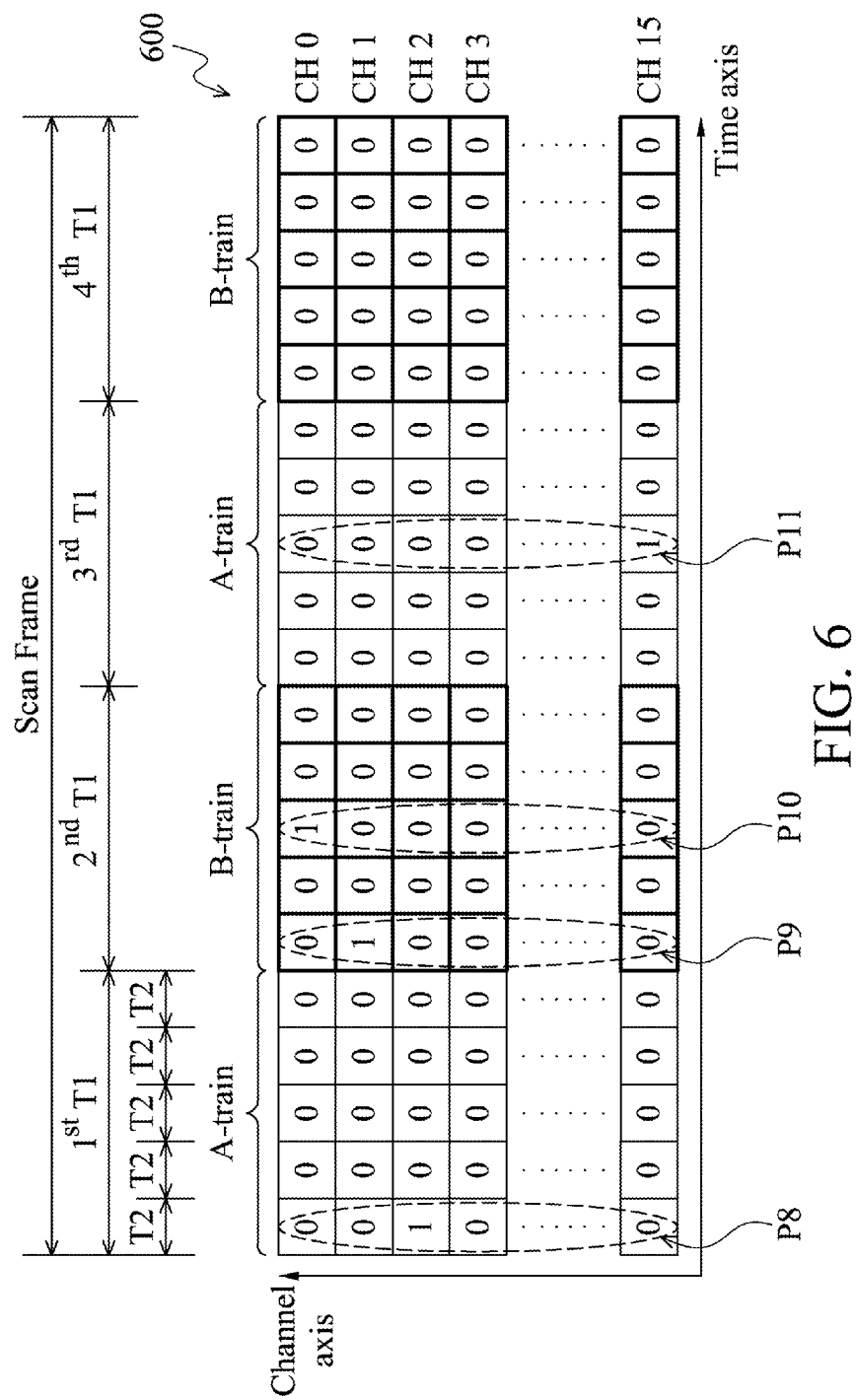
FIG. 6 shows another example illustrating a power distribution pattern of the power detection signal $S_{power}$ of the power detector in FIG. 2 according to an embodiment of the invention.
Figure 7:
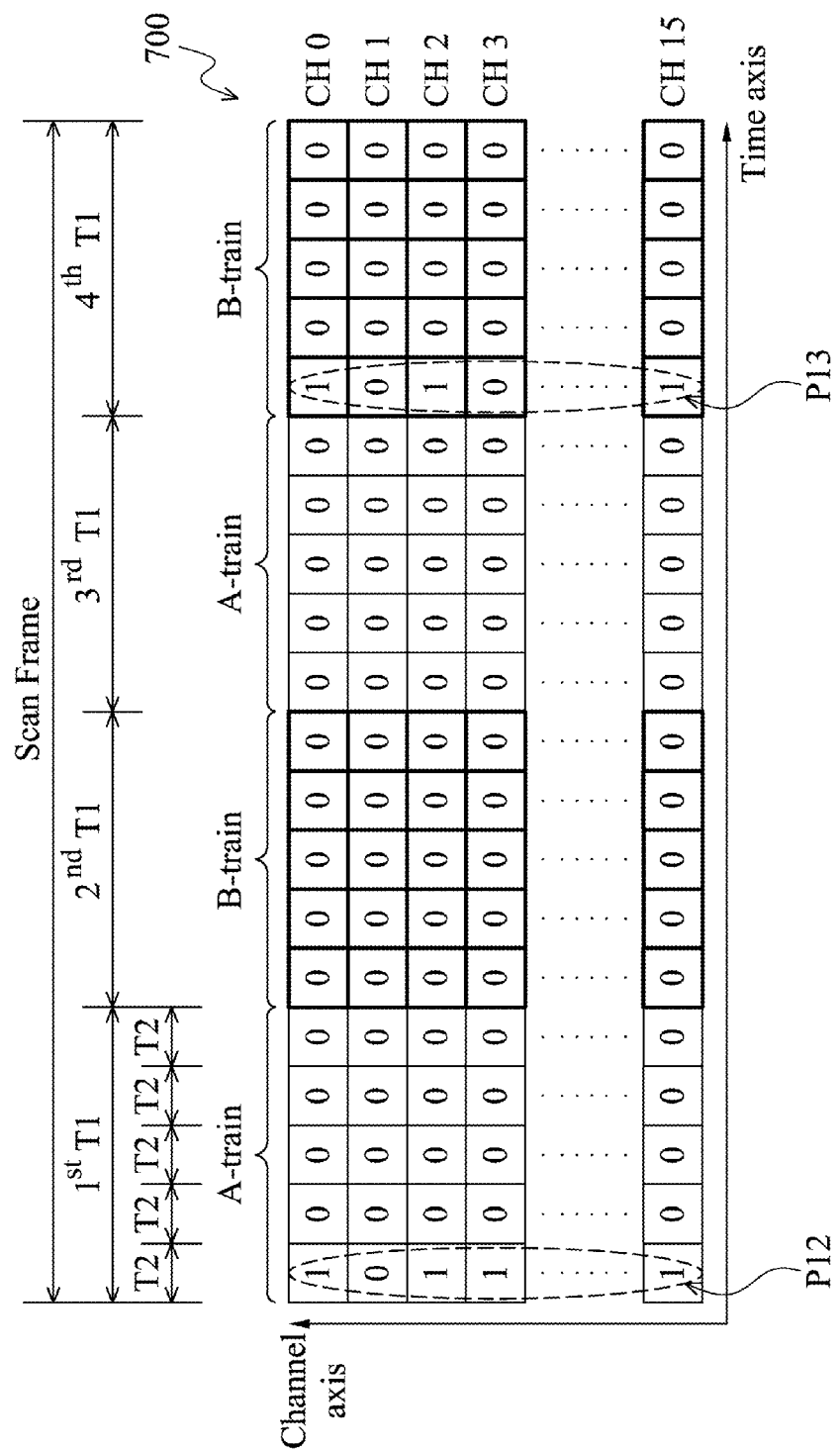
FIG. 7 shows another example illustrating a power distribution pattern of the power detection signal $S_{power}$ of the power detector in FIG. 2 according to an embodiment of the invention.
Figure 9:
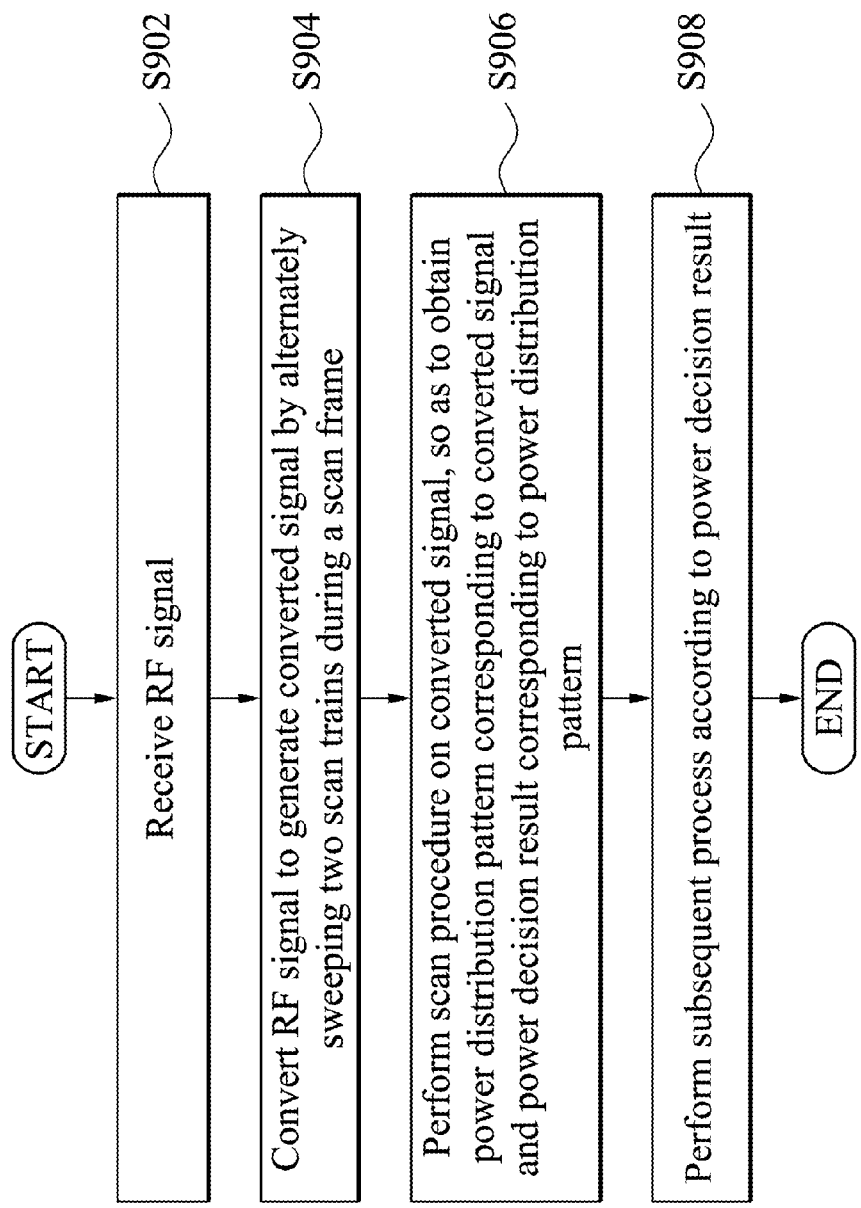
FIG. 9 shows an ID packet recognition method for a communication apparatus according to an embodiment of the invention.

FIG. 9 shows an ID packet recognition method for a communication apparatus according to an embodiment of the invention. First, an RF signal is received via an antenna (e.g. 260 of FIG. 2) and an RF module (e.g. 210 of FIG. 2) of the communication apparatus (step S902). Next, in step S904, the RF signal is converted by a down converter (e.g. 220 of FIG. 2) into a converted signal with reference to a channel select signal of a channel selector (e.g. 250 of FIG. 2), wherein the channel select signal alternately sweeps a plurality of scan trains (such as the two scan trains A-train and B-train mentioned above) during a scan frame, and each of the scan trains comprises a plurality of channels. In one embodiment, the 16 channels of the A chain are alternately swept during a time period ($1^{st}$ T1), and the 16 channels of the B chain are alternately swept during a subsequent time period (2$^{nd}$ T1). Next, in step S906, a scan procedure (such as the fast scan procedure or the normal scan procedure mentioned above) is performed on the converted signal so as to obtain a power distribution pattern corresponding to the converted signal and a power decision result corresponding to the power distribution pattern. Next, in step S908, a subsequent process is performed according to the power decision result obtained in step S906. For example, if the power decision result indicates that the power distribution pattern matches a Bluetooth ID pattern (e.g. 400 of FIG. 4), the communication apparatus may determine that the RF signal comprises a Bluetooth ID packet which was sent by a Bluetooth device nearby to the communication apparatus. Thus, the communication apparatus may set up a connection with the Bluetooth device. If the power decision result indicates that the power distribution pattern matches a noise/interference ID pattern (e.g. 500 of FIG. 5, 600 of FIG. 6), high power level has been detected in the power distribution pattern (e.g. 700 of FIG. 7) or no/low power level has been detected in the power distribution pattern (e.g. 800 of FIG. 8), the communication apparatus may continue performing the fast scan procedure periodically to monitor the power distribution pattern corresponding to the converted signal. Furthermore, when the power decision results of the fast scan procedures indicate that the power distribution pattern does not match a Bluetooth ID pattern for several scan frames, the communication apparatus may stop performing the fast scan procedure and then start to perform a normal power scan procedure, so as to assist in recognizing Bluetooth ID packets for the RF signal. Therefore, by performing the fast scan procedure of the invention, a communication apparatus may perform page scan or inquiry scan faster; thus reducing power consumption. Furthermore, the communication apparatus does not sweep full channels for the RF signal; the measuring time of the power detection for each scanned channel can be extended. High detection rates/sensitivity and low false alarm rates are therefore obtained for page and inquiry scans in a Bluetooth compatible network.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A communication apparatus, comprising:
   an RF module, for receiving an RF signal;
   a down converter, coupled to the RF module, for down converting the RF signal in response to a channel select signal to generate a converted signal, wherein the channel select signal controls the down converter to alternately sweep a plurality of scan trains during a scan frame, and each of the scan trains comprises a plurality of channels, wherein a total channel number of the plurality of scan trains is N, where 32≤N≤78; and
   a detector, coupled to the down converter, for determining whether the RF signal comprises an ID packet according to the converted signal corresponding to the channels of the plurality of scan trains.

2. The communication apparatus as claimed in claim 1, wherein a sweep time length for each scan train is substantially equal to a first time period, and the channel select signal further controls the down converter to alternately sweep the plurality of channels during the first time period.

3. The communication apparatus as claimed in claim 2, wherein time-length of the scan frame is equal to time-length of the first time period multiplied by 4.

4. The communication apparatus as claimed in claim 1, wherein the channel select signal controls the down converter not to sweep full channels of the RF signal.

5. The communication apparatus as claimed in claim 4, implemented to determine whether the RF signal comprises a Bluetooth ID packet.

6. The communication apparatus as claimed in claim 4, implemented to determine whether the RF signal comprises a Bluetooth ID packet, and wherein the plurality of scan trains comprises 32 target channels defined in the Bluetooth specification capable of being used by the Bluetooth ID packet, and each of the plurality of scan chains comprises at least a portion of the 32 target channels.

7. The communication apparatus as claimed in claim 1, wherein the detector detects the power level of the converted signal corresponding to the channels of the plurality of scan trains to generate a power detection signal, and determines whether the RF signal comprises the ID packet according to the power detection signal.

8. The communication apparatus as claimed in claim 7, wherein the power detection signal comprises a power distribution pattern comprising a plurality of bits indicating the power level of the converted signal corresponding to the plurality of channels respectively.

9. The communication apparatus as claimed in claim 7, wherein the power detection signal comprises a power distribution pattern comprising a plurality of bits indicating the power level of the converted signal at different time points corresponding to the plurality of channels respectively.

10. The communication apparatus as claimed in claim 8, wherein the detector determines that the RF signal comprises the ID packet when the power distribution pattern matches a predefined ID pattern.

11. The communication apparatus as claimed in claim 9, wherein the detector determines that the RF signal comprises the ID packet when the power distribution pattern matches a predefined ID pattern.

12. A method for recognizing an ID packet comprised in an RF signal, comprising:
    receiving an RF signal;
    converting the RF signal to generate a converted signal with reference to a channel select signal, wherein the channel select signal alternately sweeps a plurality of scan trains during a scan frame, wherein each of the scan trains comprises a plurality of channels and a total channel number of the plurality of scan trains is N, where 32≤N≤78;
    performing a scan procedure on the converted signal; and
    determining whether the RF signal comprises an ID packet according to the scan results.

13. The method as claimed in claim 12, wherein a sweep time length for each scan train is substantially equal to a first time period, and the channel select signal alternately sweeps the plurality of channels of each scan train during the first time period.

14. The method as claimed in claim 13, wherein time-length of the scan frame is equal to time-length of the first time period multiplied by 4.

15. The method as claimed in claim 12, wherein the converting step does not sweep full channels of the RF signal.

16. The method as claimed in claim 15, implemented to determine whether the RF signal comprises a Bluetooth ID packet.

17. The method as claimed in claim 15, implemented to determine whether the RF signal comprises a Bluetooth ID packet, and wherein the plurality of scan trains comprises 32 target channels defined in the Bluetooth specification capable of being used by the Bluetooth ID packet, and each of the plurality of scan chains comprises at least a portion of the 32 target channels.

18. The method as claimed in claim 12, wherein the step of performing the scan procedure comprises:
  detecting the power level of the converted signal corresponding to the channels of the plurality of scan trains to generate a power detection signal;
  and the determining step comprises:
  determining whether the RF signal comprises the ID packet according to the power detection signal.

19. The method as claimed in claim 18, wherein the power detection signal comprises a power distribution pattern comprising a plurality of bits indicating the power level of the converted signal corresponding to the plurality of channels.

20. The method as claimed in claim 18, wherein the power detection signal comprises a power distribution pattern comprising a plurality of bits indicating the power level of the converted signal at different time points corresponding to the plurality of channels.

21. The method as claimed in claim 19, wherein the determining step comprises determining that the RF signal comprises the ID packet when the power distribution pattern matches a predefined ID pattern.

22. The method as claimed in claim 20, wherein the determining step comprises determining that the RF signal comprises the ID packet when the power distribution pattern matches a predefined ID pattern.

23. The method as claimed in claim 19, further comprising:
  performing a normal scan procedure when the power distribution pattern indicates that high power level or interference has been detected for a given time period.

24. The method as claimed in claim 20, further comprising:
  performing a normal scan procedure when the power distribution pattern indicates that high power level or interference has been detected for a given time period.

25. The method as claimed in claim 19, further comprising:
  performing a normal scan procedure when the power distribution pattern indicates that no power or low power level has been detected for a given time period.

26. The method as claimed in claim 20, further comprising:
  performing a normal scan procedure when the power distribution pattern indicates that no power or low power level has been detected for a given time period.

27. A method for recognizing a Bluetooth ID packet, comprising:
  receiving an RF signal;
  converting the RF signal to generate a converted signal with reference to a channel select signal, wherein the channel select signal alternately sweeps a plurality of scan trains of N Bluetooth hopping channels during a scan frame, where $32 \leq N \leq 78$, and each of the scan trains comprises a plurality of Bluetooth hopping channels;
  performing a scan procedure on the converted signal; and
  determining whether the RF signal comprises a Bluetooth ID packet according to the scan results.

* * * * *